(12) United States Patent
Liu et al.

(10) Patent No.: US 8,229,449 B2
(45) Date of Patent: *Jul. 24, 2012

(54) METHOD AND SYSTEM FOR ALLOCATING SUBCARRIER FREQUENCY RESOURCES FOR A RELAY ENHANCED CELLULAR COMMUNICATION SYSTEM

(75) Inventors: Yong Liu, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 967 days.

This patent is subject to a terminal disclaimer.

(21) Appl. No.: 12/167,980

(22) Filed: Jul. 3, 2008

(65) Prior Publication Data

US 2009/0163218 A1 Jun. 25, 2009

Related U.S. Application Data

(60) Provisional application No. 61/016,380, filed on Dec. 21, 2007.

(51) Int. Cl.
*H04W 72/00* (2009.01)
*H04B 3/36* (2006.01)
*H04B 7/14* (2006.01)

(52) U.S. Cl. .......... 455/452.2; 455/453; 455/7; 370/315

(58) Field of Classification Search .............. 455/450, 455/451, 452.1, 452.2, 453, 7; 370/315
See application file for complete search history.

(56) References Cited

U.S. PATENT DOCUMENTS

| | | | |
|---|---|---|---|
| 5,530,575 A | 6/1996 | Acampora et al. | |
| 6,590,865 B1 * | 7/2003 | Ibaraki et al. | 370/230 |
| 7,349,665 B1 | 3/2008 | Zhu et al. | |
| 7,623,863 B2 | 11/2009 | Chen et al. | |
| 7,630,355 B2 | 12/2009 | Tao et al. | |
| 7,830,916 B2 | 11/2010 | Qi et al. | |
| 7,877,057 B2 | 1/2011 | Izumikawa et al. | |
| 7,889,699 B2 | 2/2011 | Suh et al. | |
| 7,894,388 B2 | 2/2011 | Visotsky | |
| 7,916,704 B2 | 3/2011 | Ramachandran et al. | |

(Continued)

OTHER PUBLICATIONS

Huang, L. et al., "Resource Allocation for OFDMA Based Relay Enhanced Cellular Networks," Proceedings of the IEEE 65th Vehicular Technology Conference 2007, IEEE, Apr. 2007, pp. 3160-3164, Los Alamitos, United States.

(Continued)

*Primary Examiner* — Christopher M Brandt

(74) *Attorney, Agent, or Firm* — Kenneth L. Sherman, Esq.; Michael Zarrabian, Esq.; Sherman & Zarrabian LLP

(57) ABSTRACT

A method and system for allocating subcarrier frequency resources for a relay enhanced cellular communication system is provided. The relay enhanced cellular communication system includes a base station, one or more mobile stations and one or more relay stations. Subcarrier allocation involves assigning a set of subcarriers by allocating subcarriers to one or more access communication links between mobile stations and their serving stations, to meet minimum data rate requirements of the access links, and allocating subcarriers to one or more relay communication links between the base station and relay stations to accommodate the data rates achieved on the corresponding access links. The serving stations may include one or more relay stations and the base station. Link balancing, multi-user diversity and minimum data rate constraint are jointly considered to achieve an optimal solution.

22 Claims, 7 Drawing Sheets

U.S. PATENT DOCUMENTS

| | | | |
|---|---|---|---|
| 7,990,906 | B2 | 8/2011 | Viorel et al. |
| 8,000,283 | B2 | 8/2011 | Pandey et al. |
| 8,055,189 | B2 | 11/2011 | Tsai et al. |
| 2004/0136379 | A1* | 7/2004 | Liao et al. .......... 370/395.21 |
| 2005/0232183 | A1* | 10/2005 | Sartori et al. .......... 370/319 |
| 2006/0209671 | A1 | 9/2006 | Khan et al. |
| 2007/0206525 | A1* | 9/2007 | Miller et al. .......... 370/321 |
| 2008/0045139 | A1* | 2/2008 | Chen et al. .......... 455/3.04 |
| 2008/0095037 | A1 | 4/2008 | Chang et al. |
| 2008/0107063 | A1 | 5/2008 | Oleszczuk |
| 2008/0171551 | A1 | 7/2008 | Zhu et al. |
| 2008/0175198 | A1 | 7/2008 | Singh et al. |
| 2008/0186900 | A1 | 8/2008 | Chang et al. |
| 2008/0188231 | A1* | 8/2008 | Zhu et al. .......... 455/450 |
| 2008/0219365 | A1 | 9/2008 | Viorel et al. |
| 2008/0240054 | A1 | 10/2008 | Sandhu et al. |
| 2009/0161612 | A1 | 6/2009 | Liu et al. |
| 2009/0163220 | A1 | 6/2009 | Liu et al. |
| 2009/0303918 | A1 | 12/2009 | Ma et al. |
| 2009/0312030 | A1 | 12/2009 | Lee et al. |
| 2010/0099352 | A1 | 4/2010 | Lee et al. |
| 2010/0214992 | A1 | 8/2010 | Hart et al. |
| 2010/0260113 | A1 | 10/2010 | Liu et al. |
| 2010/0272009 | A1 | 10/2010 | Cheng et al. |
| 2011/0111693 | A1 | 5/2011 | Nakao et al. |
| 2011/0228700 | A1 | 9/2011 | Mildh et al. |

OTHER PUBLICATIONS

Relay Task Group of IEEE 802.16, "P802.16j Baseline Document for Draft Standard for Local and Metropolitan Area Networks, Part 16: Air Interface for Fixed and Mobile Broadband Wireless Access Systems, Multihop Relay Specification (802.16j-06/026r2)," IEEE 802.16 Working Group, Feb. 9, 2007, pp. 1-58, United States.

Cudak, M. "Draft IEEE 802.16m Requirements (IEEE 802.16m-07/002r3)," IEEE 802.16 Working Group, Aug. 13, 2007, pp. 1-26, United States.

Genc, V. et al., "IEEE 802.16j Relay-Based Wireless Access Networks: An Overview," IEEE Wireless Communications, vol. 15, No. 5, IEEE Communications Society, Oct. 2008, pp. 56-63, United States.

IEEE 802.16 Working Group, "Overview of IEEE P802.16m Technology and Candidate RIT for IMT-Advanced," IEEE 802.16 IMT-Advanced Evaluation Group Coordination Meeting, Jan. 13, 2010, IEEE 802.16 Working Group, 2010, pp. 1-87, La Jolla, United States.

U.S. Non-Final Office Action for U.S. Appl. No. 12/422,107 mailed on Sep. 23, 2011.

Han, Z. et al., "Capacity Optimization Using Subspace Method Over Multicell OFDMA Networks," IEEE Wireless Communications and Networking Conference, Mar. 2004, pp. 2393-2398, vol. 4, IEEE Communications Society, United States.

Li, G. et al., "Downlink Radio Resource Allocation for Multi-Cell OFDMA System," IEEE Transactions on Wireless Communications, Dec. 2006, pp. 3451-3459, vol. 5, No. 12, IEEE Communications Society and the Signal Processing Society, United States.

Cudak, M., "IEEE 802.16m System Requirements (IEEE 802.16m-07/002r4)," IEEE 802.16 Working Group, Oct. 19, 2007, pp. 1-26, United States.

Shen, Z. et al., "Adaptive Resource Allocation in Multiuser OFDM Systems With Proportional Rate Constraints," IEEE Transactions on Wireless Communications, Nov. 2005, pp. 2726-2737, vol. 4, No. 6, IEEE, United States.

U.S. Non-Final Office Action for U.S. Appl. No. 12/167,967 mailed on Apr. 15, 2011.

U.S. Final Office Action for U.S. Appl. No. 12/167,967 mailed on Sep. 1, 2011.

U.S. Non-Final Office Action for U.S. Appl. No. 12/167,990 mailed on Jul. 20, 2011.

U.S. Final Office Action for U.S. Appl. No. 12/167,990, mailed on Jan. 3, 2012.

U.S. Final Office Action for U.S. Appl. No. 12/422,107, mailed on Mar. 16, 2012.

* cited by examiner

METHOD AND SYSTEM FOR ALLOCATING SUBCARRIER FREQUENCY RESOURCES FOR A RELAY ENHANCED CELLULAR COMMUNICATION SYSTEM

RELATED APPLICATION

This application claims priority from U.S. Provisional Patent Application Ser. No. 61/016,380 filed on Dec. 21, 2007, incorporated herein by reference.

FIELD OF THE INVENTION

The present invention relates to cellular communication and in particular to relay enhanced cellular communication systems.

BACKGROUND OF THE INVENTION

A typical cellular communication system includes one or more base stations (BS) and multiple mobile stations (MS), as shown in FIG. 1A. Each BS defines a cell of coverage where each MS can communicate with a BS via a BS-MS link while within communication range of the BS cell coverage. In many cellular systems, radio resource management (RRM) for orthogonal frequency division multiple access (OFDMA)-based cellular systems is utilized. Such systems address resource (frequency/time/power) allocations among BS-MS links (i.e., transmission channels defined by frequency carriers, spreading codes or time slots). There are two types of RRMs: intra-cell RRM and inter-cell RRM. The intra-cell RRM tries to assign resources to MSs or BS-MS links within a cell (and prevent interference among MSs). The inter-cell RRM tries to assign resources to multiple cells (and prevent interference among BSs and MSs in different cells). Available frequency bandwidth is divided into frequency subcarriers and assigned to the BS-MS links based on channel conditions and traffic demands. End-to-end throughput between a BS and MS is a function of Single Interference Noise Ratio (SINR) of the link between the BS and MS.

Intermediate relay stations (RS) have been used for improving throughput, coverage and spectrum efficiency of cellular systems. FIG. 1B shows an example cellular system including a base station BS, multiple mobile stations (MS) and relay stations (RS1, ..., RS6), wherein different relay cells are allocated different frequency resources. A two-hop transmission takes place between a BS and MS via a RS, wherein an RS may be an MS itself. The introduction of relay stations brings forth new challenges to the RRM design. RRM for relay enhanced cellular (REC) systems has to address resource allocations among BS-MS, BS-RS and RS-MS communication links.

In order to support relay stations, communication time frames can be divided into access zones and relay zones. In access zones, relay stations communicate with two-hop mobile stations. In relay zones, relay stations communicate with the BS. The BS can communicate with direct mobile stations (or one-hop mobile stations) in both access zones and relay zones. Note that access zones and relay zones are defined in time domain.

Conventional RRM algorithms for REC systems jointly consider multiuser diversity and link balancing to maximize overall system throughput. Such RRM approaches attempt to maximize the overall system throughput by assigning subcarriers to relay station and mobile stations with good channel conditions. Relay stations and mobile stations with bad channel conditions may not be assigned sufficient resources to meet their minimum data rate requirements.

BRIEF SUMMARY OF THE INVENTION

The invention provides a method and system for allocating subcarrier frequency resources for a relay enhanced cellular communication system. One embodiment involves allocating subcarrier frequency resource for a relay enhanced cellular communication system including a base station, one or more mobile stations and one or more relay stations. Subcarrier allocation includes assigning a set of subcarriers by allocating subcarriers to one or more access communication links between mobile stations and their serving stations, to meet minimum data rate requirements of the access links; and allocating subcarriers to one or more relay communication links between the base station and relay stations to accommodate the data rates achieved on the corresponding access links. The serving stations may include one or more relay stations and the base station.

Assigning a set of subcarriers may further include balancing subcarrier allocation for access communication links and relay communication links, to reduce frequency resource wastage. Balancing subcarrier allocation for access communication links and relay communication links may further include adaptively assigning subcarriers to access communication links between the base station and mobile stations in direct communication with the base station.

Assigning a set of subcarriers may further include detecting mobile stations and relay stations with the least achievement-requirement data rate ratio among under-assigned stations including stations that have not met minimum data-rate requirements. In addition, allocating subcarriers to one or more access communication links and relay communication links may further include allocating one or more subcarriers to each of said detected mobile stations and relay stations to meet a minimum data rate constraint of each mobile station. Also, allocating subcarriers to one or more access communication links and relay communication links may further include allocating remaining subcarriers to mobile stations and relay stations to maximize system-wide throughput, when all mobile stations meet their minimum data rate requirements.

Assigning subcarriers may further include jointly considering throughput optimization and minimum data rate constraints by allocating to each of said detected mobile stations and relay stations the best unallocated subcarrier, on which the detected station can achieve the highest data rate increase. Assigning subcarriers may further include detecting over-balanced links and under-balanced links, and reallocating subcarriers from over-balanced links to the under-balanced links that benefit the most from those subcarriers. In addition, assigning subcarriers may further include reallocating subcarriers from over-balanced links to access communication links between the base station and mobile stations in direct communication with the base station, in order to avoid frequency resource wastage.

These and other features, aspects and advantages of the present invention will become understood with reference to the following description, appended claims and accompanying figures.

DETAILED DESCRIPTION OF THE INVENTION

Figure 1B:
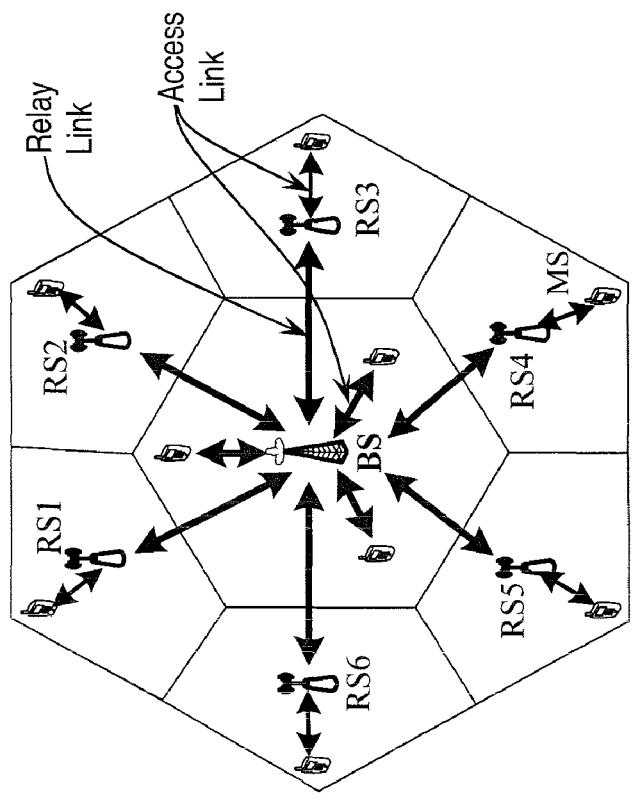
FIG. 1B shows a typical relay enhanced cellular communication system, wherein different relay cells are allocated different frequency resources.
Figure 1A:
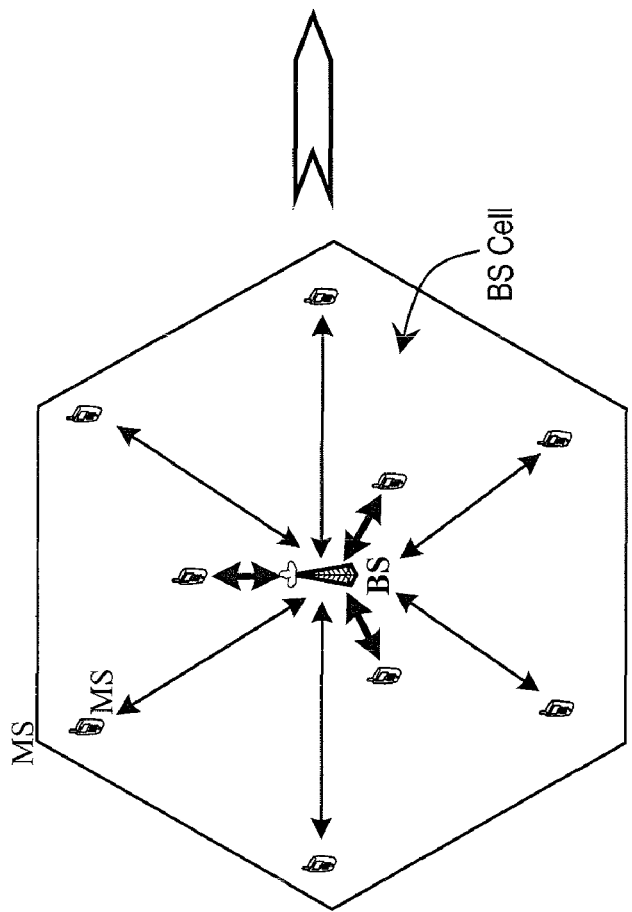
FIG. 1A shows a typical cellular communication system.

The present invention provides a method and system for allocating subcarrier frequency resources for a relay enhanced cellular communication systems. One embodiment involves allocating subcarrier frequency resources for a relay enhanced cellular communication system including a base station, one or more mobile stations and one or more relay stations. Allocating subcarrier frequency resources includes assigning a set of subcarriers by allocating subcarriers to one or more access communication links between mobile stations and their serving stations (i.e., between relay stations and mobile stations, as well as between the base station and its direct access mobile stations), to meet minimum data rate requirements of the access links. Allocating subcarrier frequency resources further includes allocating subcarriers to one or more relay communication links between the base station and relay stations to accommodate the data rates achieved on the corresponding access links.

Assigning a set of subcarriers may further include avoiding frequency resource wastage by balancing subcarrier allocation for access communication links and relay communication links. Balancing subcarrier allocation for access communication links and relay communication links may involve adaptively assigning subcarriers to access communication links between the base station and its direct mobile stations.

Adaptively assigning resource to access communication links between the base station and its direct mobile stations, i.e. BS-MS links, can be implemented as follows. The basic idea is that BS-MS links have the flexibility to acquire subcarriers in both the access zone and the relay zone. Therefore, if the access zone is short of resource to be assigned to RS-MS links, the BS-MS links can acquire less resource or no resource in the access zone, and acquire more resource in the relay zone. If the relay zone is short of resource to be assigned to BS-RS links, the BS-MS links can acquire less resource or no resource in the relay zone, and acquire more resource in the access zone (this is described in more detail in relation to FIGS. 5 and 6 further below).

Assigning a set of subcarriers may further include detecting mobile stations and relay stations with the least achievement-requirement data rate ratio among under-assigned stations (i.e., stations that have not met the minimum data-rate requirements). Then, subcarrier allocation is conducted by allocating one or more subcarriers to each of said detected mobile stations and relay stations to meet a minimum data rate constraint of each mobile station. Allocating subcarriers to one or more access communication links and relay communication links may include allocating remaining subcarriers to mobile stations and relay stations to maximize system-wide throughput, when all mobile stations meet their minimum data rate requirements.

Assigning subcarriers may further include jointly considering throughput optimization and minimum data rate constraints by allocating each of said detected mobile stations and relay stations the best unallocated subcarrier, on which it can achieve the highest data rate increase. Assigning subcarriers may further include detecting over-balanced links and under-balanced links, and reallocating subcarriers from over-balanced links to the under-balanced links that can make the most from those subcarriers. Further, assigning subcarriers may include reallocating subcarriers from over-balanced links to access communication links between the base station and its direct mobile stations, in order to avoid frequency resource wastage.

There are two types of mobile stations (MS): 1-hop MS and 2-hop MS. A 1-hop MS directly communicates with BS. Any resource assigned to a 1-hop MS can be fully utilized in its direct access link. A 2-hop MS communicates with BS via a relay station (RS), therefore, resource has to be assigned to both relay link and access link to enable the communication between MS and BS. If the resources assigned to the relay link and access link are unbalanced, additional resource assigned to the overbalanced link will be wasted. In order to avoid this waste, the additional resource assigned to the overbalanced link can be reallocated to 1-hop MS (since 1-hop MS can always utilize the resource without causing any wastage).

An implementation of the present invention for maximizing the total throughput of an OFDMA-based REC system, and at the same time satisfy minimum data rate constraints is now described. This implementation of frequency resource allocation is a joint function of: subcarrier allocations in both the access zone and relay zone, spectral efficiency/multiuser diversity, minimum data rate requirements of mobile stations and balancing between access and relay links.

Figure 2:
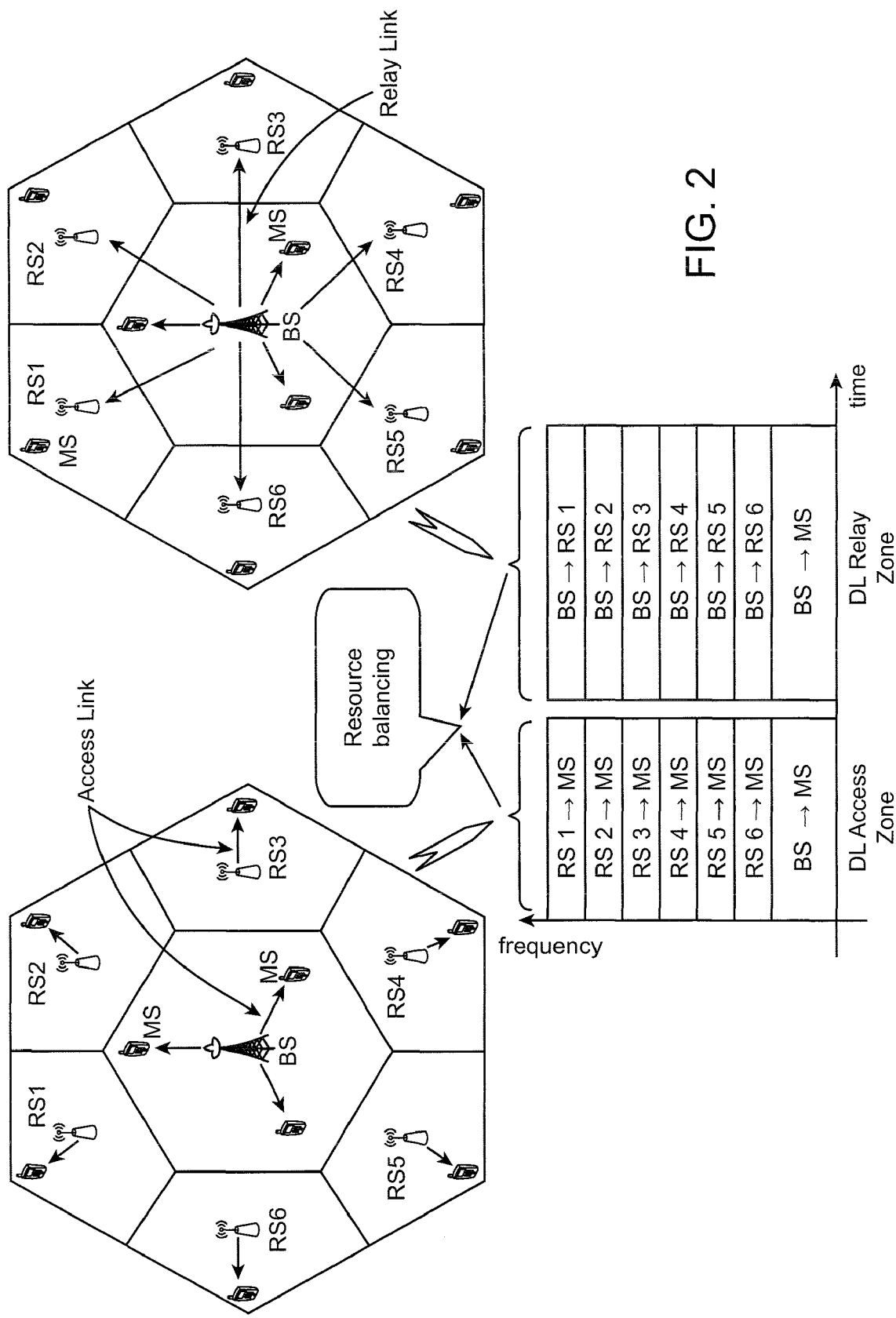
FIG. 2 shows an example relay enhanced cellular communication system including a base station (BS), one or more mobile stations (MS) and one or more relay stations (RS), according to an embodiment of the present invention.

As shown in FIG. 2, resource allocation in access zones can be considered as a multi-cell resource allocation problem. For the cell structure on the left side of the drawing, different relay cells are allocated different frequency resources. The "multi-cell" comprises the BS cell (including BS and all 1-hop MS's) as well as six relay cells (each relay cell includes a RS and all 2-hop MSs supported by the RS). Frequency resources have to be allocated to both the BS cell and all relay cells. Assigning subcarriers in an access zone is a two-step process: first, a cell is selected for subcarrier allocation, and then, a link within the cell is selected to accept the allocated resource.

In relay zone, resources are allocated only to links originated from the BS. Therefore, it can be considered as a "single-cell" problem. Resource allocation in relay zones can be considered as a single-cell resource allocation problem.

The end-to-end throughput of a multi-hop MS depends on the achievable data rates in both the access link and the relay links. Radio resource management (RRM) including frequency resource allocation for REC systems considers capacity balancing among access links and relay links to avoid the waste of system resources. Multi-user diversity and minimum data rate constraints are also considered for efficient and fair resource allocation.

According to the invention, subcarriers are first allocated to the most under-assigned mobile stations and relay stations to meet the minimum data rate requirements of all mobile stations, and then, the remaining subcarriers are assigned to the mobile stations and relay stations that can make the best use of the subcarriers. The balancing between access links and relay links is maintained in both stages to avoid resource wastage. This approach enables fair and optimal resource allocation in REC systems, which is applicable to systems such as OFDMA-based broadband wireless standards IEEE 802.16j and IEEE 802.16m, for example.

In a preferred embodiment, the invention focuses on downlink communications from serving stations to relay and mobile stations. Every communication link should be assigned enough resource to achieve a minimum data rate. The transmission power from BS and relay stations are fixed. In other words power control is not considered as a means to optimize/balance resource allocation. Also, a single cell system is considered. As such, inter-cell interferences from other BS cells are not counted. A MS communicates with BS either directly (one-hop), or through one relay station (two-hop). Communication via two or more relay stations (i.e., larger than two-hop) is not considered. The invention also assumes that no subcarrier is reused among relay cells, and the resource controller responsible for subcarrier allocation is aware of the achievable data rate of each link on each subcarrier.

Based on the assumption, resource allocation includes allocating subcarriers in the access zone to make access links meet the minimum data rate requirements. Then, subcarriers are allocated in the relay zone so that relay links essentially match the achieved data rates on access links. Since access links of one-hop mobile stations can acquire subcarriers in both the access zone and the relay zone, resource allocations these links can be adjusted between the two zones to help two-hop mobile stations meet their requirements.

When access links of two-hop mobile stations cannot obtain sufficient subcarriers in the access zone to meet their minimum rate requirements, one-hop mobile stations may release their subcarrier resources in the access zone, and redeem the resources in the relay zone. Further, when relay links of two-hop mobile stations cannot obtain sufficient subcarriers to match the data rates achieved in the corresponding access links, one-hop mobile stations may release their subcarrier resources in the relay zone, and redeem the resources in the access zone.

If resources are sufficient in both the access zone and the relay zone to satisfy the minimum data rate requirements of all mobile stations, the remaining subcarriers are allocated in a similar way as described by Huang, Lei, Rong, Mengtian, Wang, Lan, Xue, Yisheng, Schulz, Egon, "Resource Allocation for OFDMA Based Relay Enhanced Cellular Networks", IEEE VTC 2007, but with two modifications according to an embodiment of the present invention. Huang's paper presents a three-step resource allocation process. The three-step process involves first allocating subcarriers independently in the access zone and the relay zone to maximize the throughput of each zone (each subcarrier is assigned to the link that can achieve the highest data rate increase with the subcarrier). Then, subcarriers are reallocated from over-balanced links to under-balanced links in both the access zone and the relay zone until no throughput improvement could be achieved. Lastly, the power levels of relay links and access links are adjusted to balance capacities of the two-hop links. The above three-step process is modified according to the present invention such that for resource balancing, remaining subcarriers (i.e., remaining subcarriers from the available set of subcarriers) are picked out from the most over-balanced links and reallocated to one of the under-balanced links (the selected link to accept the subcarrier should achieve the highest data rate increase with this subcarrier among all under-balanced links). Further, after the resource balancing operation, if there are still over-balanced links in either the access zone or the relay zone, the additional subcarriers from these links are reallocated to the access links of one-hop mobile stations to avoid resource wastage. An example implementation is described below based on the following definitions:

N: The number of subcarriers
L: The number of RSs
$M_j$: The number of MSs served by BS/RS j (BS: j=0, RS: j=1, ..., L)
$T_F$: The time duration of the downlink frame
$T_R$: The time duration of the relay zone
$T_A$: The time duration of the access zone
$r_{XY_{j_k}}^{(n)}$: The achievable data rate of the $XS_j$-$YS_k$ link on subcarrier n (BS: j=0, RS: j=1, ..., L)
$r_{j_k}^o$: The minimum data rate requirement of YS k (served by XS j)

$$\alpha_{XY,j_k}^{(n)} = \begin{cases} T_A/T_F: \text{If subcarrier } n \text{ is assigned to the } XS_j - \\ \qquad YS_k \text{ link in the access zone} \\ 0: \text{If subcarrier } n \text{ is not assigned to the } XS_j - \\ \qquad YS_k \text{ link in the access zone} \end{cases}$$

$$\beta_{XY,j_k}^{(n)} = \begin{cases} T_R/T_F: \text{If subcarrier } n \text{ is assigned to the } BS - \\ \qquad YS_k \text{ link in the relay zone} \\ 0: \text{If subcarrier } n \text{ is not assigned to the } BS - \\ \qquad YS_k \text{ link in the relay zone} \end{cases}$$

$$R_{BM}^o = \sum_{k=1}^{M_0} r_{0_k}^o: \text{The aggregated data rate requirements of 1-hop MSs}$$

$$R_{BRM}^o = \sum_{j=1}^{L} \sum_{k=1}^{M_j} r_{j_k}^o: \text{The aggregated data rate requirements of 2-hop MSs}$$

$$R_{BRM,j}^o = \sum_{k=1}^{M_j} r_{j_k}^o: \text{The aggregated data rate requirements of 2-hop MSs in relay cell } j(j=1, \ldots, L)$$

End-to-End Throughput of all 1-Hop MSs:

$$R_{BM} = \sum_{k=1}^{M_0} r_{BM,0_k}, \text{ or}$$

$$R_{BM} = R_{BMa} + R_{BMr}$$

where, $$r_{BM,0_k} = \sum_{n=1}^{N} \alpha_{BM,0_k}^{(n)} \cdot r_{BM,0_k}^{(n)} + \sum_{n=1}^{N} \beta_{BM,0_k}^{(n)} \cdot r_{BM,0_k}^{(n)}$$

$$R_{BMa} = \sum_{k=1}^{M_0} \sum_{n=1}^{N} \alpha_{BM,0_k}^{(n)} \cdot r_{BM,0_k}^{(n)}$$

$$R_{BMr} = \sum_{k=1}^{M_0} \sum_{n=1}^{N} \beta_{BM,0_k}^{(n)} \cdot r_{BM,0_k}^{(n)}$$

End-to-End Throughput of all Two-Hop MSs $$R_{BRM} = \sum_{j=1}^{L} R_{BRM,j}$$

where, $$R_{RM,j} = \sum_{k=1}^{M_j} r_{RM,j_k}, j=1, \ldots, L$$

$$r_{RM,j_k} = \sum_{n=1}^{N} \alpha_{RM,j_k}^{(n)} \cdot r_{RM,j_k}^{(n)}, j=1, \ldots, L$$

$$R_{BR,j} = \sum_{n=1}^{N} \beta_{BR,0j}^{(n)} \cdot r_{BR,0j}^{(n)}$$

$$R_{BRM,j} = \min\{R_{RM,j}, R_{BR,j}\}$$

System Overall Throughput $$R_{all} = R_{BM} + R_{BRM}$$

A BS-MS link is under-assigned, if:

$$r_{BM,0_k} < r_{0_k}^o, \text{ for any } k=1, 2, \ldots, M_0.$$

A RS-MS link is under-assigned, if:

$r_{RM,j_k} < r_{j_k}^o$, for any j=1, ... L; k=1, ..., $M_j$.

A BS-RS link is under-assigned, if:

$R_{BR,j} < R_{BRM,j}^o$, for any j=1, 2, ..., L.

A relay cell and its corresponding BS-RS link is balanced, if:

$|R_{BR,j} - R_{RM,j}| < \epsilon$, for any j=1, ..., L.

A relay cell is over-balanced, or a BS-RS link is under-balanced, if:

$R_{RM,j} - R_{BR,j} \geq \epsilon$, for any j=1, ..., L.

A relay cell is under-balanced or a BS-RS link is over-balanced, if:

$R_{BR,j} - R_{RM,j} \geq \epsilon$, for any j=1, ..., L.

A BS-MS link is under-charged, if:

$$\frac{r_{BM,0_k}}{r_{0_k}^o} < \max_{p=1,\ldots,L} \left(\frac{R_{BRM,p}}{R_{BRM,p}^o}\right) \text{ for any } k=1, \ldots, M_0.$$

Figure 3:
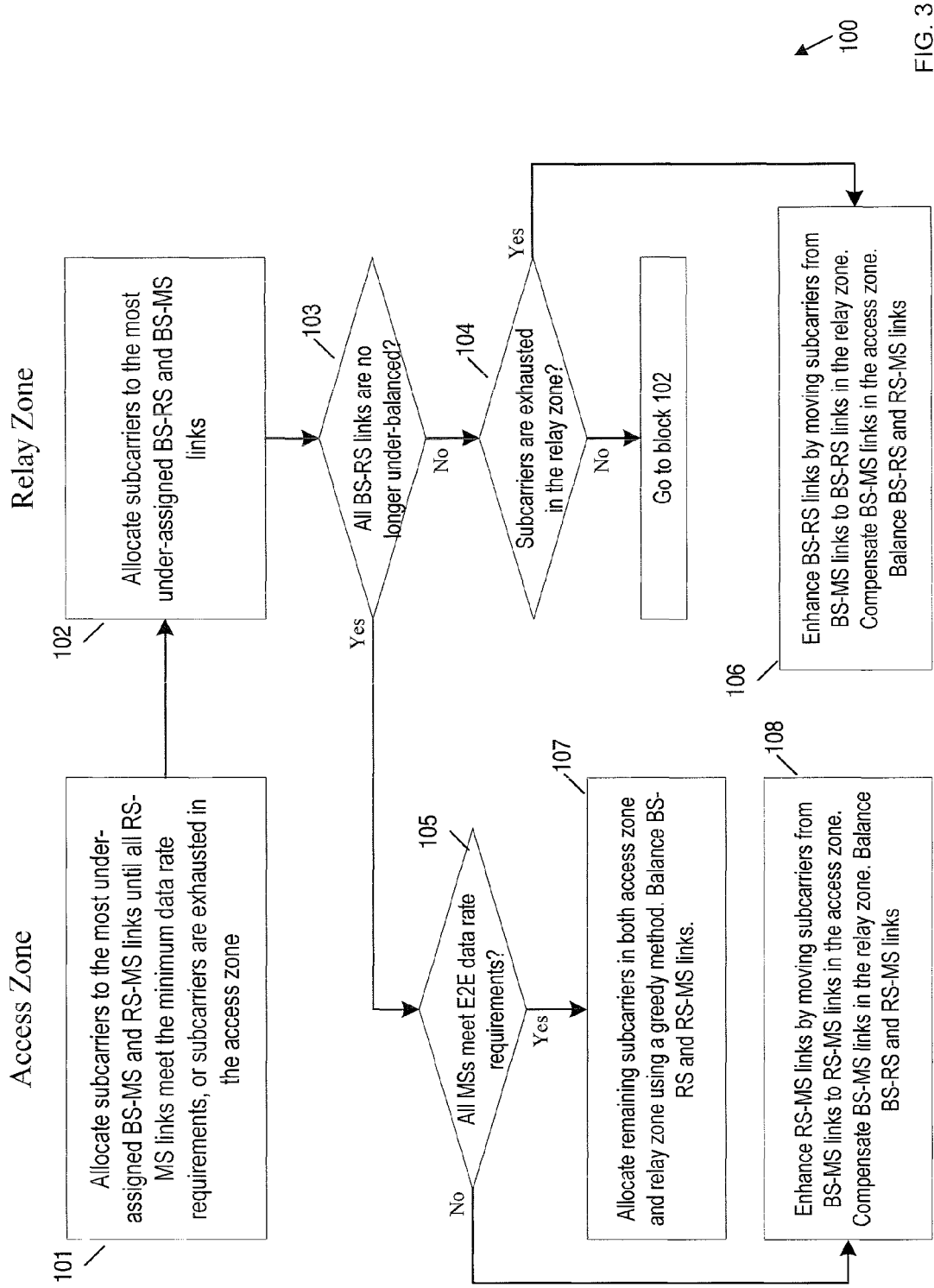
FIG. 3 shows a functional block diagram for allocating subcarrier frequency resources for a relay enhanced cellular communication system, according to an embodiment of the invention.

FIG. 3 shows an example subcarrier allocation process 100 according to the present invention:

Block 101: A set of subcarriers are assigned to both BS-MS and RS-MS links in the access zone until all RS-MS links meet their minimum data rate requirements, or until the subcarriers are exhausted. Initially, each link is assigned the best unallocated subcarrier, on which it can achieve the highest data rate increase. The initial link allocation sequence can be random, or based on certain priorities, such as the descending sequence of the maximum achievable rates over all unallocated subcarriers. Iterations are then started to allocate remaining subcarriers to under-assigned BS-MS and RS-MS links. In each iteration, the most under-assigned link is first identified based on the following expression:

$$[j^*, k^*] = \arg_{j,k} \min \left(\frac{r_{XM,j_k}}{r_{j_k}^o}\right) \text{ for } \begin{array}{l} j=0,1,\ldots,L \\ k=1,\ldots,M_j \end{array}$$

The selected link is then granted the best unallocated subcarrier, on which it can achieve the highest data rate increase. Once a BS-MS or RS-MS link is allocated enough subcarriers to meet its minimum data rate requirement, i.e., $r_{XM,j_k} \geq r_{j_k}^o$, j=0, 1, 2, ... L; k=1, 2, ..., $M_j$, this link should not be assigned any more subcarriers in this block. The subcarrier allocation continues until all RS-MS links meet their minimum data rate requirements, or until the subcarriers are exhausted. The BS-MS links need not meet their minimum data rate requirements in this block.

Block 102: Subcarriers are assigned to BS-RS and BS-MS links in the relay zone to meet the end-to-end data rate requirements of both 1-hop and 2-hop mobile stations. The subcarrier allocation in block 102 is very similar to that in block 101. After the initial allocation, iterations are started to assign subcarriers to the under-assigned BS-RS and BS-MS links. In each iteration, the most under-assigned link is identified based on the following expression:

$$[BY^*, p^*] = \arg_{BY,p} \min \left(\min\left(\frac{r_{BY,0_p}}{r_{0_p}^o}\right)\bigg|_{BY=BM}, \min\left(\frac{R_{BY,p}}{R_{BRM,p}^o}\right)\bigg|_{BY=BR}\right).$$

for BM: p = 1, ..., $M_0$, BR: p = 1,2, ..., L

The selected link is granted the best unallocated subcarrier, on which it can achieve the highest data rate increase. A BS-RS link should stop accepting new subcarriers in block 102 when it is no longer under-balanced. A BS-MS link should stop accepting new subcarriers in block 102 when it meets the minimum data rate requirement, or when it is no longer under-charged.

Block 103: If all BS-RS links are no longer under-balanced, proceed to block 105, otherwise, proceed to block 104.

Block 104: If all subcarriers are exhausted in the relay zone, proceed to block 106, otherwise go back to block 102. Specifically, the subcarrier allocation in block 102 continues until all links stop accepting subcarriers or until the subcarriers are exhausted. If subcarriers are exhausted in the relay zone before BS-RS links match the corresponding RS-MS links, then proceed to block 106 to enhance the BS-RS links.

Block 105: If all mobile stations meet end-to-end (E2E) data rate requirements, proceed to block 107, otherwise proceed to block 108. Specifically, if all BS-RS and BS-MS links stop accepting subcarriers, and all mobile stations meet E2E data rate requirements, then proceed to block 107 to allocate remaining subcarriers in both the access zone and the relay zone. Otherwise if all BS-RS and BS-MS links stop accepting subcarriers, but one or more two-hop mobile stations have not met their requirements due to the weak RS-MS links, then proceed to block 108 to enhance those RS-MS links.

Block 106: Enhance BS-RS links by moving subcarriers from BS-MS links to BS-RS links in the relay zone. Compensate BS-MS links in the access zone. Balance BS-RS and RS-MS links.

Block 107: Allocate remaining subcarriers in both access zone and relay zone using a greedy method. Balance BS-RS and RS-MS links.

Block 108: Enhance RS-MS links by moving subcarriers from BS-MS links to RS-MS links in the access zone. Compensate BS-MS links in the relay zone. Balance BS-RS and RS-MS links.

Figure 4:
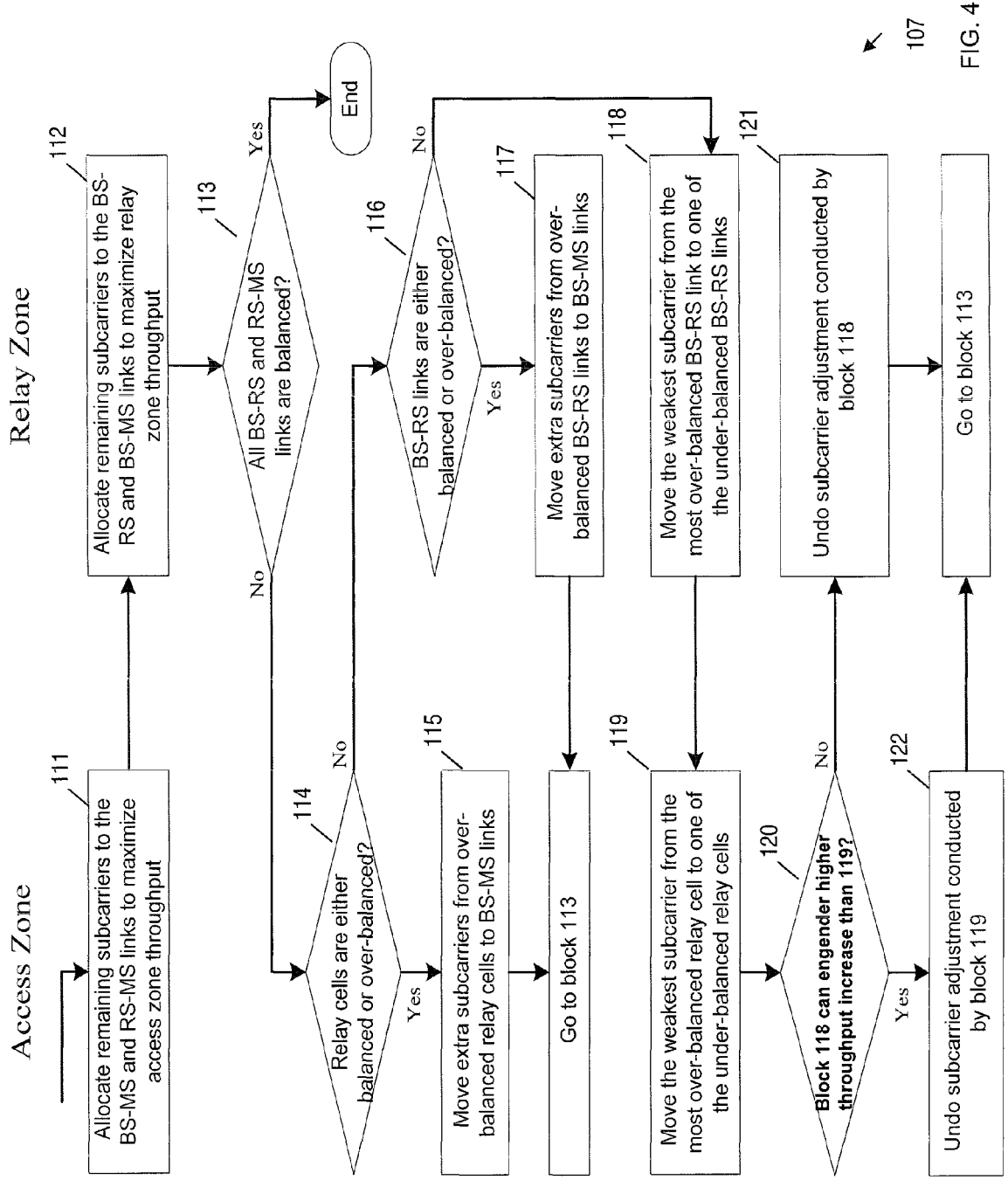
FIG. 4 shows a functional block diagram illustrating details of allocating remaining subcarrier frequency resources in the allocation process of FIG. 3.

FIG. 4 shows further details of block 107 of FIG. 3, according to an embodiment of the invention, including two major operations, wherein first the remaining subcarriers are allocated in both the access zone and the relay zone by using a greedy allocation method, and then, the BS-RS and RS-MS links are balanced. These operations are discussed in further detail as performed by the blocks in FIG. 4 as:

Block 111: Each of the remaining subcarriers is assigned to the BS-MS or RS-MS link that can achieve the highest data rate increase with the subcarrier. The link selected to accept the subcarrier can be described as:

$$[j^*, k^*] = \arg_{j,k} \max_{\substack{j=0,\ldots,L \\ k=1,\ldots,M_j}} \left(r_{XM,j_k}^{(n)}\right).$$

Block 112: Each of the remaining subcarriers is assigned to the BS-RS or BS-MS link that can achieve the highest data rate increase with the subcarrier. The link selected to accept the subcarrier can be described as:

$$[BX^*,p^*] = \arg_{BX,p} \max_{BX=\{BM,BR\}} (\max_{p=1,\ldots,M_0}(r_{BM,0_p}^{(n)}), \max_{p=1,\ldots,L}(r_{BR,0_p}^{(n)})).$$

Block 113: If all BS-RS links and their corresponding RS-MS links are balanced, then stop, otherwise proceed to block 114.

Block 114: If relay cells are either balanced or over-balanced, proceed to block 115, otherwise proceed to block 116.

Block 115: Extra (remaining) subcarriers are moved (reallocated) from overbalanced relay cells to BS-MS links until all BS-RS links and their corresponding RS-MS links are balanced, proceed to block 113. When reallocating (moving) subcarriers from overbalanced relay cells to BS-MS links, the best-assigned RS-MS link is first identified in each over-balanced relay cell based on the following expression:

$$k^* = \arg_k \max_{k=1,\ldots,M_j} \left( \frac{r_{RM,j_k}}{r^o_{j_k}} \right) \text{ for over-balanced relay cell } j.$$

The subcarrier that benefits the least from this RS-MS link is picked out and reallocated to one of the BS-MS links. The BS-MS link selected to accept the subcarrier should achieve the highest data rate increase with this subcarrier among all BS-MS links.

Block 116: If BS-RS links are either balanced or over-balanced proceed to block 117, otherwise, proceed to block 118.

Block 117: Reallocate extra subcarriers from over-balanced BS-RS links to BS-MS links. When reallocating subcarriers from BS-RS links to BS-MS links, the subcarrier that benefits the least from each over-balanced BS-RS link is picked out and reallocated to one of the BS-MS links. The BS-MS link selected to accept the subcarrier should achieve the highest data rate increase with this subcarrier among all BS-MS links. Proceed to block 113.

Block 118: This block, together with blocks 119-122 (below), handle the cases when certain BS-RS links are over-balanced, while some others are under-balanced. The approach involves reallocating the weakest subcarrier from the most over-balanced BS-RS link to one of the under-balanced BS-RS links. First, the most over-balanced BS-RS link is identified as:

$$j^* = \arg_j \max(R_{BR,j} / R_{RM,j} | R_{BR,j} > R_{RM,j})$$

The subcarrier that benefits the least from this link is picked out, and reallocated to one of the under-balanced BS-RS links. The BS-RS link selected to accept the subcarrier should achieve the highest data rate increase with this subcarrier among all under-balanced BS-RS links.

Block 119: This block first identifies the most over-balanced relay cell, which is defined as:

$$j^\# = \arg_j \max(R_{RM,j} / R_{BR,j} | R_{RM,j} > R_{BR,j});$$

and then, the best-assigned RS-MS link in relay cell $j^\#$ is targeted based on the following expression:

$$k^\# = \arg_k \max_{k=1,\ldots,M_{j^\#}} \left( \frac{r_{RM,j_k^\#}}{r^o_{j_k^\#}} \right)$$

The subcarrier that benefits the least to the RS-MS link is picked out and reallocated to one of the under-balanced relay cells. The relay cell selected to accept the subcarrier should achieve the highest data rate increase with this subcarrier among all under-balanced relay cells. Blocks 118, 119 are preferably operating simultaneously, and should not be affected by the results of each other.

Block 120: Block 118 can engender higher throughput increase than block 119? If not, proceed to block 121, otherwise proceed to block 122.

Block 121. Undo subcarrier adjustment conducted by block 118. Go to block 113.

Block 122: Undo subcarrier adjustment conducted by block 119. Go to block 113.

In blocks 120-121, the throughput increase caused by block 118 is compared with that caused by block 119. If block 118 leads to higher throughput increase, the subcarrier adjustment in block 119 is undone, otherwise, the subcarrier adjustment in block 118 is undone. The subcarrier adjustments (allocations/reallocations) in the access zone and relay zone continue until all BS-RS links and their corresponding RS-MS links are balanced.

Figure 5:
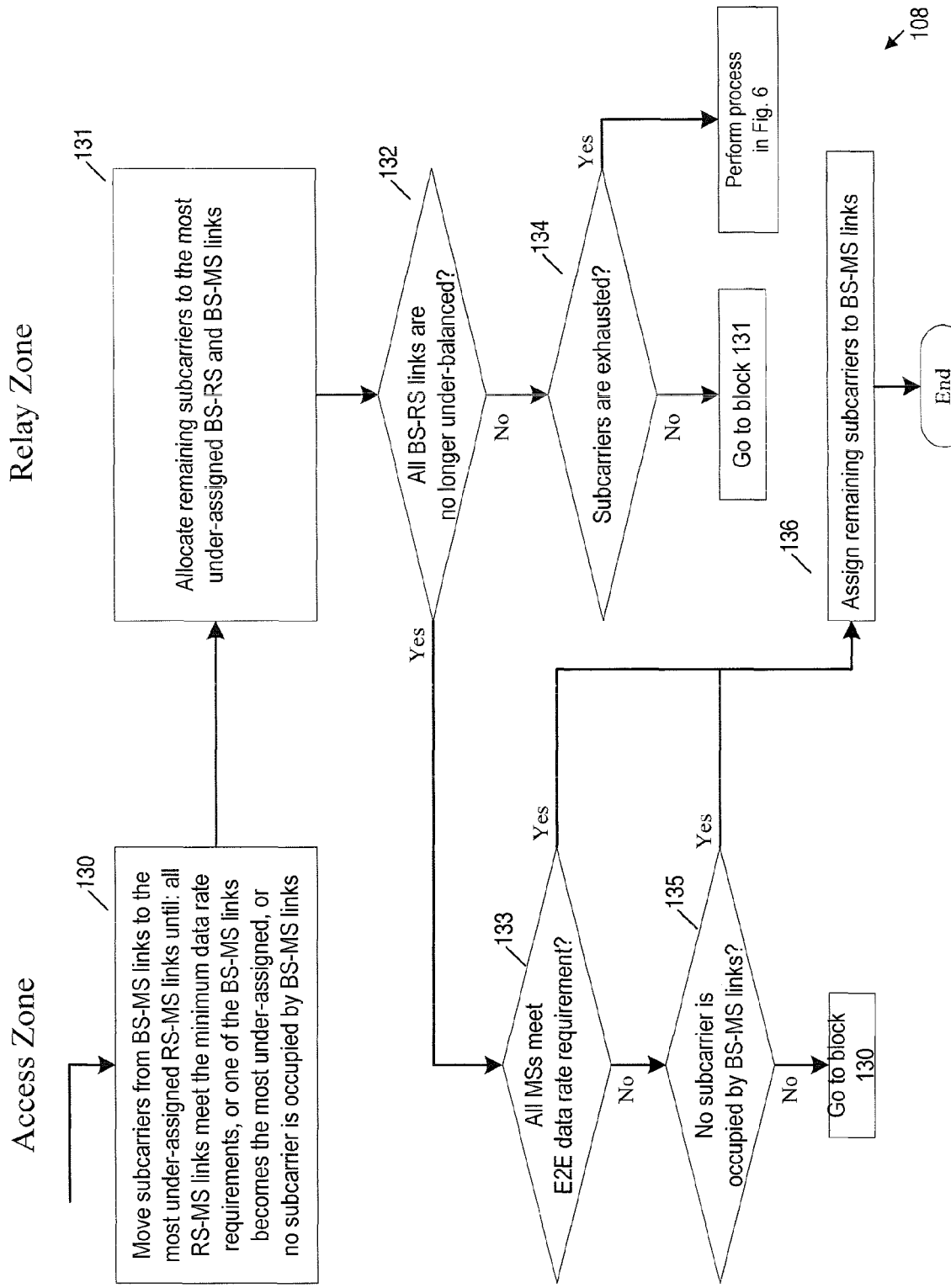
FIG. 5 shows a functional block diagram illustrating details of enhancing RS-MS links by reallocation in the allocation process of FIG. 3.

FIG. 5 shows further details of block 108 of FIG. 3, according to an embodiment of the invention, performing three major operations including first reallocating subcarriers from BS-MS links to the under-assigned RS-MS links in the access zone; then, compensating in the relay zone, those BS-MS links that sacrifice resources in the access zone; and, reinforcing BS-RS links that become under-balanced due to the first operation.

Block 130: All subcarriers occupied by BS-MS links in the access zone become "available" to the under-assigned RS-MS links. Similar to block 101 in FIG. 3, in each iteration, the most under-assigned RS-MS link is identified and granted the best "available" subcarrier, on which it can achieve the highest data rate increase. Once a subcarrier is reallocated, it no longer belongs to the original host. The subcarrier adjustment (allocation/reallocation) continues until one of the following three conditions is met: all RS-MS links meet their minimum data rate requirements, one of the BS-MS link becomes the most under-assigned link, or all subcarriers occupied by BS-MS links are exhausted.

Block 131: Allocate remaining subcarriers to the most under-assigned BS-RS and BS-MS links.

Block 132: If all BS-RS links are no longer under-balanced, proceed to block 133 otherwise proceed to block 134.

Block 133: If all mobile stations meet E2E data rate requirement proceed to block 136 otherwise proceed to block 135?

Block 134: If all subcarriers are exhausted, proceed to the process in FIG. 6 below, otherwise proceed to block 131.

Block 135: If no subcarrier is occupied by BS-MS links, proceed to block 136 otherwise proceed to block 130.

Block 136: Assign remaining subcarriers to BS-MS links. End.

Block 131 in FIG. 5 is similar to block 102 in FIG. 3, wherein in each iteration, the most under-assigned link, which can be either a BS-MS link or a BS-RS link, is granted the best unallocated subcarrier, on which it can achieve the highest data rate increase. This enables those BS-MS links, which sacrifice their resources in the access zone, to be compensated in the relay zone. It also enables the BS-RS links, which become under-balanced due to operations in block 130, enhance their capacities until a new balance is achieved. A BS-RS link should stop accepting new subcarriers in block 131 when it is no longer under-balanced. A BS-MS link should stop accepting new subcarriers when the link meets the minimum data rate requirement, or when it is no longer under-charged. The subcarrier allocation continues until all links stop accepting subcarriers or until the subcarriers are exhausted.

If all BS-RS and BS-MS links stop accepting subcarriers, and all mobile stations meet end-to-end data rate requirements, the remaining subcarriers in the relay zone are allocated to BS-MS links. Again, each of the remaining subcarriers is assigned to the BS-MS link that can achieve the highest data rate increase with the subcarrier.

If all BS-RS and BS-MS links stop accepting subcarriers, but one or more two-hop mobile stations have not met their requirements due to the weak RS-MS links, further subcarrier adjustment is needed in the access zone to enhance those RS-MS links.

As long as there are still subcarriers occupied by BS-MS links in the access zone, these subcarriers can be released to feed the under-assigned RS-MS links. If all subcarriers occupied by BS-MS links are exhausted, the RS-MS links cannot be improved any further. Therefore, the remaining subcarriers in the relay zone are allocated to BS-MS links. If one or more BS-MS links are still under-assigned, the most under-assigned BS-MS links should be satisfied first. After all BS-MS links meet their minimum data rate requirements, the remaining subcarriers are assigned to the BS-MS links that can achieve the highest data rate increases with the subcarriers.

If the subcarriers are exhausted in the relay zone before BS-RS links match the corresponding RS-MS links, the process in FIG. 6 below is performed.

Figure 6:
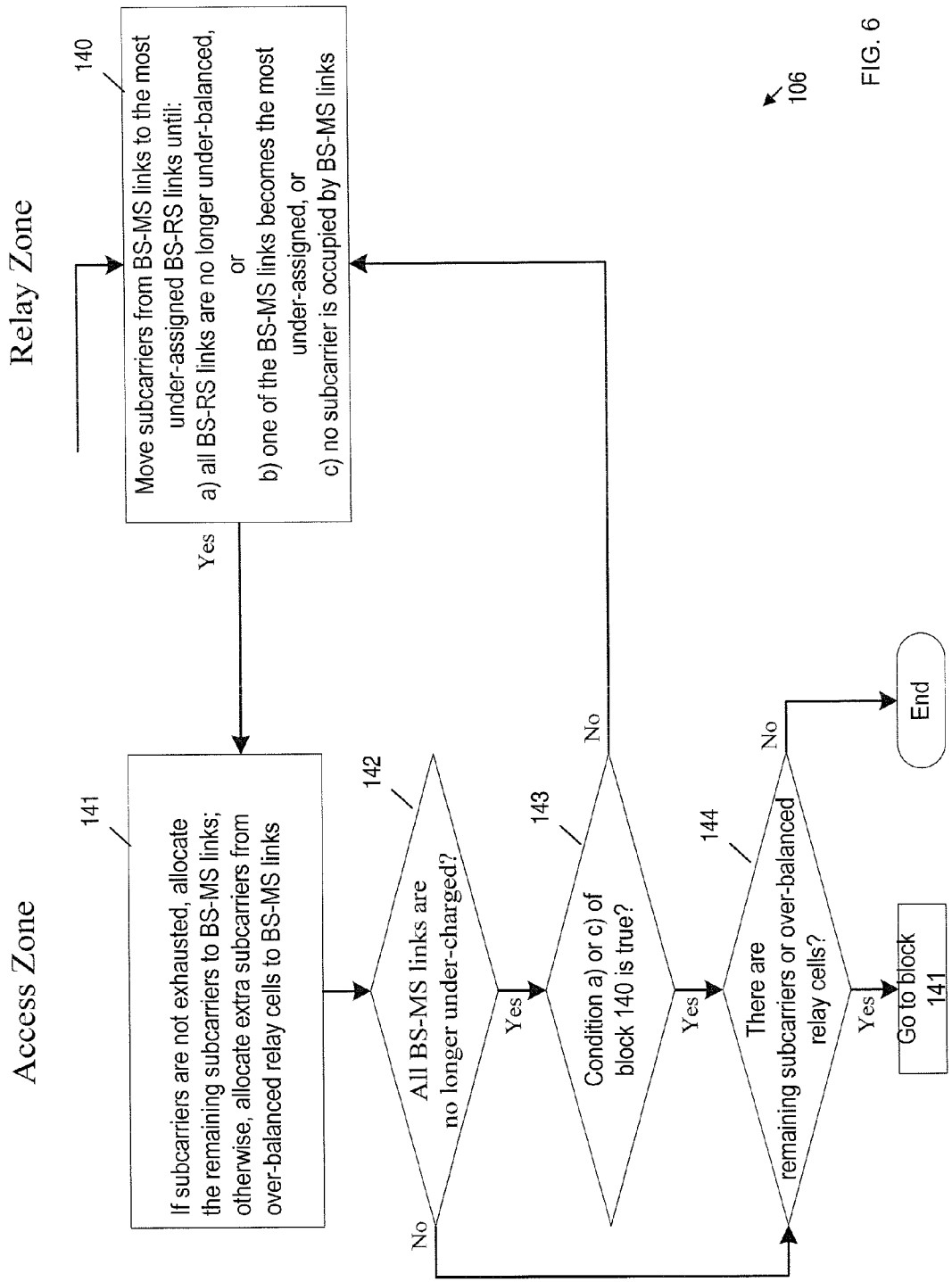
FIG. 6 shows a functional block diagram illustrating details of enhancing BS-RS links in the allocation process of FIG. 3.

FIG. 6 shows further details of block 106 of FIG. 3, according to an embodiment of the invention, involving two major operations including first reallocating (moving) subcarriers from BS-MS links to the under-assigned BS-RS links in the relay zone, and then compensating in the access zone those BS-MS links that sacrifice resources in the relay zone. BS-MS links can acquire subcarriers in both the relay zone and the access zone. Once BS-RS links cannot obtain enough subcarriers in the relay zone, the BS-MS links can release the subcarriers they occupied in the relay zone to the BS-RS links. This is the named "sacrificing". Once BS-MS links release some resource in the relay zone, it may not have enough resource to meet the minimum requirement; therefore, they can acquire some resource in the access zone, as a "compensation" to their resource loss in the relay zone. The process in FIG. 6 includes the following blocks:

Block 140: Move subcarriers from BS-MS links to the most under-assigned BS-RS links until: a) all BS-RS links are no longer under-balanced, or b) one of the BS-MS links becomes the most under-assigned, or c) no subcarrier is occupied by BS-MS links.

Block 141: If the subcarriers are not exhausted, allocate the remaining subcarriers to BS-MS links; otherwise, allocate remaining subcarriers from over-balanced relay cells to BS-MS links.

Block 142: If all BS-MS links are no longer under-charged proceed to block 143, otherwise proceed to block 144.

Block 143: Are condition a) or c) in block 140 met? If not, proceed to block 140, otherwise proceed to block 144.

Block 144: If there are remaining subcarriers or over-balanced relay cells, proceed to block 141, otherwise end.

In block 140 above, subcarriers occupied by BS-MS links in the relay zone become "available" to the under-assigned BS-RS links. In each iteration, the most under-assigned BS-RS link is identified and granted the best "available" subcarrier. Similar to block 140 in FIG. 5, the subcarrier adjustment continues until one of the following conditions are met: (a) all BS-RS links are no longer under-balanced, or (b) one of the BS-MS links becomes the most under-assigned link, or (c) all subcarriers occupied by BS-MS links are exhausted.

Blocks 141-144 enable those BS-MS links which sacrifice their resources in the relay zone, to be compensated in the access zone. If the subcarriers in the access zone are not exhausted, the BS-MS links are "charged" by the remaining subcarriers. In each iteration, the most under-assigned BS-MS link is identified and granted the best unallocated subcarrier. If the subcarriers in the access zone are already exhausted, the BS-MS links are "charged" by the remaining subcarriers from the over-balanced relay cells. Similar to block 111 of FIG. 4, in each iteration, the most over-balanced relay cell is first identified and the best-assigned RS-MS link is selected from the relay cell. Then, the subcarrier that benefits the least from the RS-MS link is picked out and reallocated to one of the under-charged BS-MS links. The BS-MS link selected to accept the subcarrier should achieve the highest data rate increase with this subcarrier among all under-charged BS-MS links.

Once all BS-MS links are no longer under-charged, they are ready to release subcarriers to the BS-RS links in the relay zone if both of the following conditions are met: there are still subcarriers occupied by BS-MS links in the access zone, and one or more BS-RS links are under-balanced. If at least one of these two conditions cannot be met, the BS-MS links continue accepting remaining subcarriers, as well as remaining subcarriers from the over-balanced relay cells, in the access zone. The subcarriers are first allocated to the under-assigned BS-MS links to enable them to meet the minimum data rate requirements. Thereafter, each remaining subcarrier is assigned to the BS-MS link that can achieve the highest data rate increase with the subcarrier. The process ends when subcarriers are exhausted in the access zone, and all relay cells are no longer over-balanced.

Figure 7:
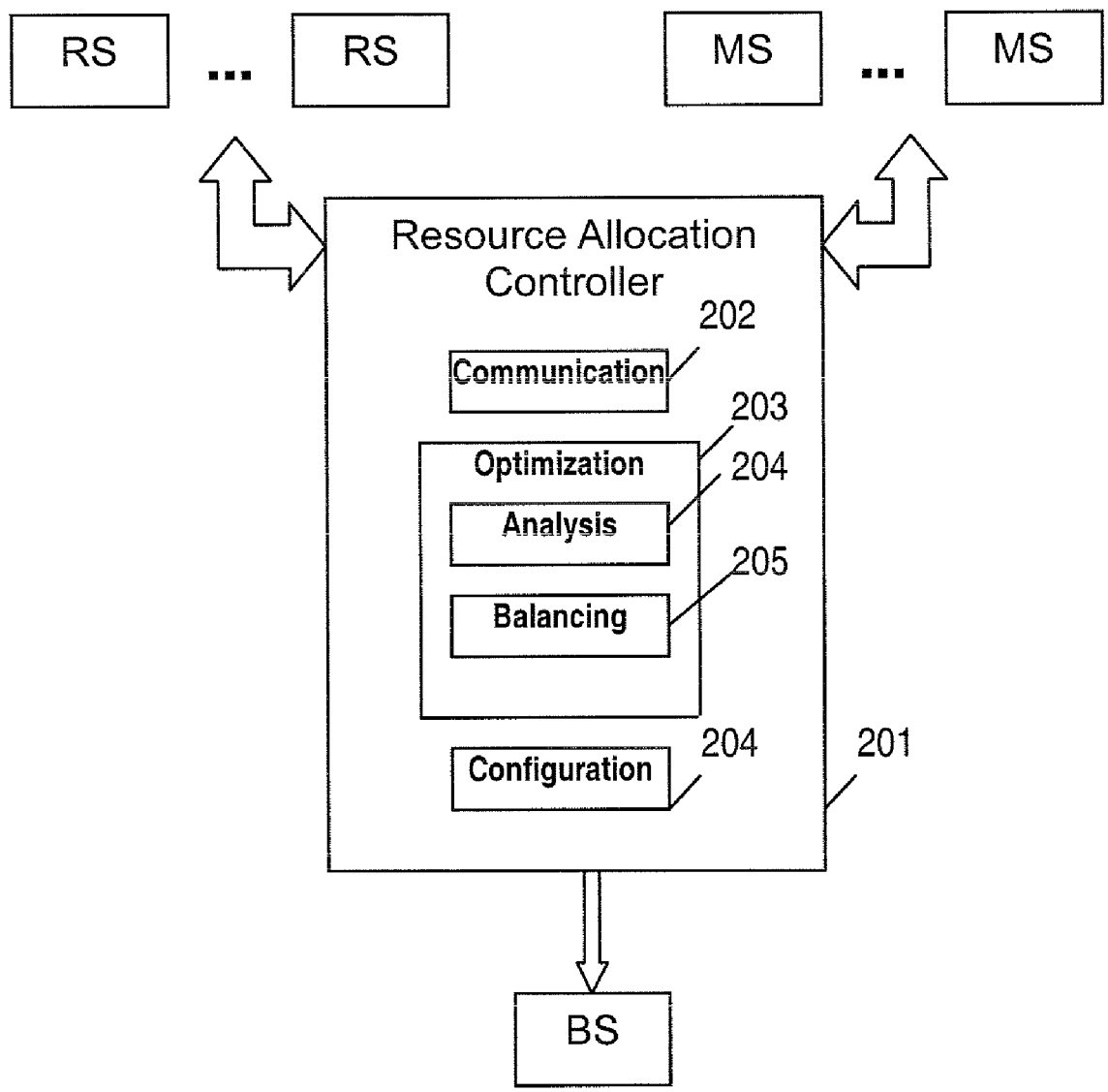
FIG. 7 shows a functional block diagram of a resource allocation controller configured for allocating subcarrier frequency resources for a relay enhanced cellular communication system, according to an embodiment of the invention.

FIG. 7 shows a functional block diagram of a relay enhanced cellular system 200 including a resource allocation controller 201 configured for allocating subcarrier frequency resources, according to an embodiment of the invention. The controller implements the blocks in FIGS. 3-6, described above. The controller 201 includes a communication module 202, an optimization module 203 and a configuration module 204. The communication module exchanges information with the RS and MS stations. The optimization module includes an analysis module 204 and a balancing module 205. The analysis module determines link throughput and assigned/underassigned status of the RS-MS and BS-RS links as described above. The balancing module determines a balancing plan for allocation/reallocation/assignment of subcarrier resources to the links based on the analysis results. The configuration module communicates with the BS, RS and MS stations to configure them according to the balancing plan.

Accordingly, embodiments of the invention provide subcarrier frequency resource allocation, which involves assigning a set of subcarriers by allocating subcarriers to one or more access communication links between mobile stations and their serving stations (i.e. between relay stations and mobile stations, as well as between the base station and its direct mobile stations), to meet minimum data rate requirements of the access links; and allocating subcarriers to one or more relay communication links between the base station and relay stations to accommodate the data rates achieved on the corresponding access links.

Assigning a set of subcarriers further may include avoiding frequency resource wastage by balancing subcarrier allocation for access communication links and relay communication links. Balancing subcarrier allocation for access communication links and relay communication links may be by adaptively assigning subcarriers to access communication links between the base station and its direct mobile stations. Assigning a set of subcarriers further includes detecting mobile stations and relay stations with the least achievement-requirement data rate ratio among under-assigned stations (i.e. stations that have not met the minimum data-rate requirements). Achievement-requirement data rate ratio is the ratio between achieved data rate and required data rate. The achieved data rate can be calculated once the subcarriers assigned to a link/cell are decided. The required data rate is determined by the applications supported by the BS/MS pairs. In block 101, a formula is provided to identify the link with the least achievement and requirement ratio.

Allocating subcarriers to one or more access communication links and relay communication links further includes allocating one or more subcarriers to each of said detected mobile stations and relay stations to meet a minimum data rate constraint of each mobile station. Allocating subcarriers to one or more access communication links and relay communication links may further include allocating remaining subcarriers to mobile stations and relay stations to maximize system-wide throughput, when all mobile stations meet their minimum data rate requirements.

In addition, assigning subcarriers may further include jointly considering throughput optimization and minimum data rate constraints by allocating each of said detected mobile stations and relay stations the best unallocated subcarrier, on which it can achieve the highest data rate increase. Assigning subcarriers may further include detecting over-balanced links to under-balanced links, and reallocating subcarriers from over-balanced links to the under-balanced links that can make the most from those subcarriers. Further, assigning subcarriers may include reallocating subcarriers from over-balanced links to access communication links between the base station and its direct mobile stations, in order to avoid frequency resource wastage.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of allocating subcarrier frequency resources for a relay enhanced cellular communication system including a base station, one or more mobile stations and one or more relay stations, comprising:
   assigning a set of subcarriers by:
      allocating subcarriers to one or more access communication links between mobile stations and their serving stations, to meet minimum data rate requirements of the access links;
      allocating subcarriers to one or more relay communication links between the base station and relay stations to accommodate the data rates achieved on the corresponding access links;
      balancing subcarrier allocation for access communication links and relay communication links; and
      detecting over-balanced links and under-balanced links; and
      reallocating remaining subcarriers from largest over-balanced links to under-balanced links that benefit most from the remaining subcarriers by achieving a highest data rate increase among the under-balanced links;
   wherein assigning subcarriers further includes:
      for all remaining over-balanced links, reallocating subcarriers from the remaining over-balanced links to access communication links between the base station and mobile stations in direct communication with the base station for avoiding frequency resource wastage.

2. The method of claim 1, wherein the serving stations include one or more relay stations and the base station.

3. The method of claim 2, wherein balancing subcarrier allocation for access communication links and relay communication links reduces frequency resource wastage.

4. The method of claim 3, wherein balancing subcarrier allocation for access communication links and relay communication links further includes adaptively assigning subcarriers to access communication links between the base station and mobile stations in direct communication with the base station, wherein adaptively assigning subcarriers includes: if the access zone is short of resources to be assigned to relay stations-mobile station links, then base station-mobile station links acquire less resources or no resources in the access zone, and acquire more resources in the relay zone, and if the relay zone is short of resources to be assigned to base station-relay station links, the base station-mobile station links acquire less resources or no resources in the relay zone, and acquire more resources in the access zone.

5. The method of claim 1 wherein:
   assigning a set of subcarriers further includes detecting mobile stations and relay stations with the least achievement-requirement data rate ratio among under-assigned stations including stations that have not met minimum data-rate requirements;
   allocating subcarriers to one or more access communication links and relay communication links further includes allocating one or more subcarriers to each of said detected mobile stations and relay stations to meet a minimum data rate constraint of each mobile station; and
   allocating subcarriers to one or more access communication links and relay communication links further includes allocating remaining subcarriers to mobile stations and relay stations to maximize system-wide throughput, when all mobile stations meet their minimum data rate requirements.

6. The method of claim 5 wherein assigning subcarriers further includes jointly considering throughput optimization and minimum data rate constraints by allocating to each of said detected mobile stations and relay stations the best unallocated subcarrier which can achieve essentially the highest data rate increase.

7. The method of claim 1, wherein reallocating remaining subcarriers to under-balanced links that benefit most comprises selecting a remaining subcarrier that benefits least to the largest over-balanced link.

8. The method of claim 7, wherein the selected remaining subcarrier benefits an under-balanced link the most of all other under-balanced links.

9. The method of claim 7, further comprising reallocating the remaining subcarriers to mobile stations and relay stations maximizes system-wide throughput when all mobile stations meet minimum data rate requirements.

10. An apparatus for allocating subcarrier frequency resources for a relay enhanced cellular communication system including a base station, one or more mobile stations and one or more relay stations, comprising:
    an optimization module configured for assigning a set of subcarriers by:
    allocating subcarriers to one or more access communication links between mobile stations and their serving stations, to meet minimum data rate requirements of the access links; and
    allocating subcarriers to one or more relay communication links between the base station and relay stations to accommodate the data rates achieved on the corresponding access links,
    wherein the optimization module comprises:
        a detection module configured for detecting over-balanced links and under-balanced links; and
        a balancing module configured for balancing subcarrier allocation for access communication links and relay communication links, wherein the balancing module is further configured for reallocating subcarriers from largest over-balanced links to under-balanced links that benefit most from the remaining subcarriers by achieving a highest data rate increase among the under-balanced links,
    wherein the optimization module is further configured for all remaining over-balanced links, reallocating subcarriers from the remaining over-balanced links to access communication links between the base station and mobile stations in direct communication with the base station for avoiding frequency resource wastage.

11. The apparatus of claim 10, wherein the serving stations include one or more relay stations and the base station.

12. The apparatus of claim 11, wherein the optimization module reduces frequency resource wastage.

13. The apparatus of claim 12, wherein the balancing module is further configured for balancing subcarrier allocation for access communication links and relay communication links by adaptively assigning subcarriers to access communication links between the base station and mobile stations in direct communication with the base station.

14. The apparatus of claim 12, wherein the detection module is further configured for detecting mobile stations and relay stations with the least achievement-requirement data rate ratio among under-assigned stations include stations that have not met minimum data-rate requirements;
    wherein the optimization module is further configured for allocating one or more subcarriers to each of said detected mobile stations and relay stations to meet a minimum data rate constraint of each mobile station, and allocating remaining subcarriers to mobile stations and relay stations to maximize system-wide throughput, when all mobile stations meet their minimum data rate requirements.

15. The apparatus of claim 13, wherein the optimization module is further configured for jointly considering throughput optimization and minimum data rate constraints by allocating to each of said detected mobile stations and relay stations the best unallocated subcarrier which can achieve essentially the highest data rate increase.

16. A relay enhanced cellular communication system, comprising:
    a base station, one or more mobile stations and one or more relay stations;
    a controller configured for allocating subcarrier frequency resources, the controller comprising:
        an optimization module configured for assigning a set of subcarriers by:
    allocating subcarriers to one or more access communication links between mobile stations and their serving stations, to meet minimum data rate requirements of the access links, and allocating subcarriers to one or more relay communication links between the base station and relay stations to accommodate the data rates achieved on the corresponding access links, wherein the optimization module comprises a balancing module configured for balancing subcarrier allocation for access communication links and relay communication links; and
    an analysis module configured for detecting over-balanced links and under-balanced links;
    wherein the balancing module is further configured for reallocating remaining subcarriers from over-balanced links to under-balanced links that benefit most from the remaining subcarriers by achieving a highest data rate increase among the under-balanced links,
    wherein the optimization module is further configured for all remaining over-balanced links, reallocating subcarriers from the remaining over-balanced links to access communication links between the base station and mobile stations in direct communication with the base station for avoiding frequency resource wastage.

17. The system of claim 16, wherein the serving stations include one or more relay stations and the base station.

18. The system of claim 17, wherein the balancing module reduces frequency resource wastage.

19. The system of claim 18, wherein the balancing module is further configured for balancing subcarrier allocation for access communication links and relay communication links by adaptively assigning subcarriers to access communication links between the base station and mobile stations in direct communication with the base station.

20. The system of claim 18, wherein the analysis module is further configured for detecting mobile stations and relay stations with the least achievement-requirement data rate ratio among under-assigned stations include stations that have not met minimum data-rate requirements;
    the optimization module is further configured for allocating one or more subcarriers to each of said detected mobile stations and relay stations to meet a minimum data rate constraint of each mobile station, and allocating remaining subcarriers to mobile stations and relay stations to maximize system-wide throughput, when all mobile stations meet their minimum data rate requirements.

21. The system of claim 19, wherein the optimization module is further configured for jointly considering throughput optimization and minimum data rate constraints by allocating to each of said detected mobile stations and relay stations the best unallocated subcarrier which can achieve essentially the highest data rate increase.

22. The system of claim 16, wherein the stations comprise wireless communication stations.

* * * * *